United States Patent [19]

Ara et al.

[11] Patent Number: 4,935,070
[45] Date of Patent: Jun. 19, 1990

[54] METHOD OF MANUFACTURING HEAT RESISTING MAGNETIC SCALE

[75] Inventors: Katsuyuki Ara; Hideyuki Yagi, both of Ibaraki; Hideo Imeda, Amagasaki; Toshitsugu Ohmura, Amagasaki; Megumi Ohmine, Amagasaki; Masaharu Moriyasu, Amagasaki, all of Japan

[73] Assignees: Japan Atomic Energy Research Institute; Mitsubishi Denki Kabushiki Kaisha, both of Japan

[21] Appl. No.: 237,384

[22] Filed: Aug. 29, 1988

[30] Foreign Application Priority Data

Aug. 31, 1987 [JP] Japan ................... 62-217315
Aug. 31, 1987 [JP] Japan ................... 62-217316
Dec. 29, 1987 [JP] Japan ................... 62-335888

[51] Int. Cl.⁵ .............................................. C21D 1/09
[52] U.S. Cl. ........................................ 148/122; 148/903
[58] Field of Search ............... 148/100, 300, 121, 306, 148/122, 903, 12 A; 428/611, 694

[56] References Cited

U.S. PATENT DOCUMENTS 4,510,371 4/1985 Nakamura et al. ................ 148/903
4,552,596 11/1985 Ichiyama et al. .................. 148/903

FOREIGN PATENT DOCUMENTS 48-10655 4/1973 Japan .

OTHER PUBLICATIONS

Kamewaka et al., "A Magnetic Guidance Method for Automated Guided Vehicles", pp. 69-74, 12/87.
Uemura et al., "Application and Precision of Measuring Instrument Using Magnetic Scale", vol. 20, pp. 12-19, 12/87.

Primary Examiner—S. Kastler
Attorney, Agent, or Firm—Leydig, Voit & Mayer

[57] ABSTRACT

A method of manufacturing a heat resisting magnetic scale is disclosed which comprises a manufacturing process in which at least a part of a heat resisting base is heated and a manufacturing process in which the part which has been heated is immediately cooled down for the purpose of changing the magnetic characteristics of the part of the base which has been heated and the Curie point of the part which has been heated is raised to 100° C. or higher.

A heating resisting magnetic scale which cannot be demagnetized at high temperatures and cannot be separated even if it is subjected to rapid change in temperatures, and which exhibits excellent stability and measuring precision.

17 Claims, 5 Drawing Sheets

4,935,070

METHOD OF MANUFACTURING HEAT RESISTING MAGNETIC SCALE

BACKGROUND OF THE INVENTION

DETAIL DESCRIPTION OF THE INVENTION

This invention relates to a method of manufacturing a heat resisting magnetic scale for use in high temperature regions.

FIG. 1 is a cross-sectional view of a conventional magnetic scale disclosed, for example, in Japanese Pat. No. 10655/1973. Referring to the figure, a non-magnetic metal layer 7 such as copper or aluminum which is formed by plating or cladding is applied to the surface of a base 6 which is made of steel or steel alloy such as one sold under the tradename Elinvar in the form of a bar with a circular cross-sectional shape. The surface of the non-magnetic metal layer 7 has a magnetic layer 8 made of Cu-Ni alloy applied thereto.

A conventional magnetic scale is constituted as described above, and it can be used in, for example, precision machine tools when mounted on the same. A magnetic scale of the type described above first records signals (N, S, magnetization) at a predetermined interval on the magnetic layer 8 in the longitudinal direction of the base 6. Next, a magnetic head (omitted from the illustration) is brought into contact with the magnetic layer 8, and this magnetic head and the base 6 on which the signals are recorded are moved relative to each other. As a result of this, the relative position can be detected by the magnetic head.

As shown in Table 1.2.6 and 6.6.4 of the "Metal Data Book" (edited by Japan Metal Society, 1974), the coefficients of thermal expansion of iron and an iron-alloy such as "Elinvar" (tradename) are each $12.1 \times 10^{-6}$ and $8.0 \times 10^{-6}$. The coefficients of thermal expansion of copper and aluminum are respectively $17.0 \times 10^{-6}$ and $23.5 \times 10^{-6}$. As also shown in Table 6 (6-2) of "Heat Resisting Steel Data" (edited by Special Steel Club, 1965), the coefficient of thermal expansion of Cu-Ni alloy is, for example, $11.9 \times 10^{-6}$ (AISI 21° to 316 °C.) on S-816 (AISI No. 671). In a magnetic scale of the type shown in FIG. 1, the coefficient of thermal expansion of the magnetic scale is to a substantial extent determined by the coefficient of thermal expansion of the base 6. However, if a magnetic scale of the type described above is used in a high temperature region of 100° to 300° C., the non-magnetic metal layer 7 or the magnetic layer 8 will inevitably be separated from the base 6 due to the difference in the degree of expansion as between the base 6, the non-magnetic metal layer 7 and the magnetic layer 8, this difference being due to the fact that the base 6, the non-magnetic metal layer 7 and the magnetic layer 8 each have different coefficients of thermal expansion.

Furthermore, even if separation of this type does not occur, the degree of expansion of the base 6, the non-magnetic metal layer 7 and the magnetic layer 8 is different due to the difference in the coefficients of thermal expansion of the base 6, the non-magnetic metal layer 7 and the magnetic layer 8, causing the base 6, the non-magnetic metal layer 7 and the magnetic layer 8 to be subjected to stress in correspondence with the degree of thermal expansion. As a result of this, the magnetic characteristics of the magnetic layer 8 deteriorate, causing the sensitivity of the magnetic scale itself to be lowered.

It is known that the conventional way of using a magnetic tape or the like as a magnetic scale involves demagnetizing the magnetic tape or the like when subjected to heat. Thus therefore a conventional way of using a magnetic tape or the like can only be used at temperatures of, for example, less than 50°C.

SUMMARY OF THE INVENTION

An object of the present invention is to overcome the above-described problems and to provide a method of manufacturing a heat resisting magnetic scale which cannot be demagnetized at high temperatures and in which no separation occurs even if the same is subjected to rapid changes in temperature, and which thereby exhibits excellent stability and consistent measuring precision.

A method of manufacturing a heat resisting magnetic scale comprising: a manufacturing process in which at least a part of a heat resisting base is heated; and a manufacturing process in which the portion which has been heated is immediately cooled down, whereby the magnetic characteristics of the heated part of the base is changed and the Curie point of the heated part is raised to 100° C. or higher.

A method of manufacturing a heat resisting magnetic scale comprising: a manufacturing process in which a heat resisting base is at least in part provided with a material which is different from that of the heat resisting base; a manufacturing process in which at least a part of the material and the base which is disposed below the material is heated for the purpose of mixing the material with the base which is disposed below the material; and a manufacturing process in which the part which has been heated is immediately cooled down, whereby the magnetic characteristics of the part which has been heated are changed and the Curie point of the part which has been heated is raised to 100 °C. or higher.

A method of manufacturing a heat and corrosion resisting magnetic scale comprising: a manufacturing process in which non-magnetic austenitic stainless steel is heated and melted by a first high energy density heat source and the thus-heated portion is changed to a magnetic body; and a manufacturing process in which said magnetic body portion is irradiated with a second high energy density heat source to heat and melt again the surface of said magnetic body portion and then rapidly solidified for the purpose of forming a non-magnetic layer on said surface.

PREFERRED EMBODIMENTS OF THE INVENTION

An embodiment of the present invention will now be described with reference to the accompanying drawings.

Figure 1:
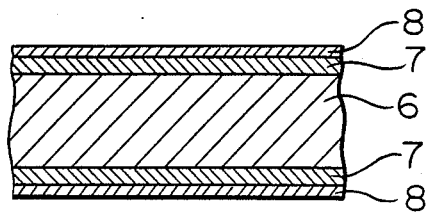
FIG. 1 is a cross-sectional view of a conventional magnetic scale.
Figure 2:
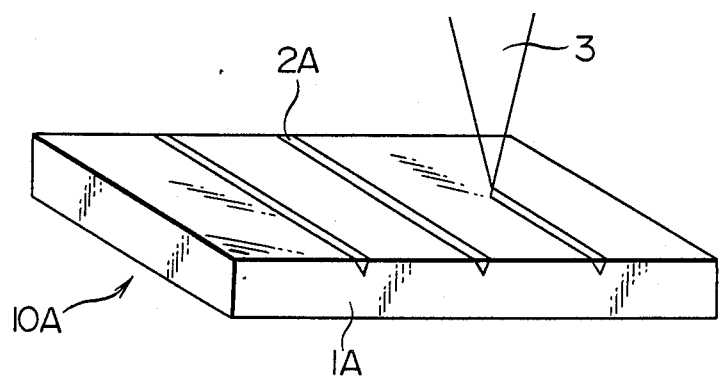
FIG. 2 is a perspective view of a heat resisting magnetic scale according to an embodiment of the present invention.

FIG. 2 is a perspective view of a heat resisting magnetic scale 10A produced according to an embodiment of the present invention. Referring to this figure, a plate-like heat resisting base 1A is made of, for example, a non-magnetic stainless steel plate (such as JIS SUS 304). The base 1A is heated by a heating means such as an electron beam 3 in such a manner that, for example, it is heated at predetermined intervals, and is immediately cooled down. A portion 2A to be heated and cooled down hereinafter portion 2A is changed in its magnetic characteristics due to the heating and cooling down. This portion 2A forms a magnetic layer and the Curie point thereof is 100 °C. or higher.

The magnetic scale manufactured according to the present invention can be applied to, for example, rails for the purpose of controlling the robots and vehicles or the like.

Figure 3:
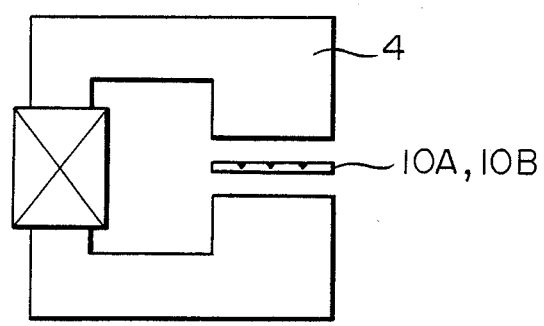
FIG. 3 is a side structural view illustrating a state wherein the heat resisting magnetic scale according to the embodiment of the present invention is being magnetized.

FIG. 3 is a side structural view illustrating a manner in which the heat resisting magnetic scale 10A is magnetized. Referring to this figure, the heat resisting magnetic scale 10A is disposed between two poles of an electromagnet 4 for magnetization, whereby it is magnetized.

Figure 4:
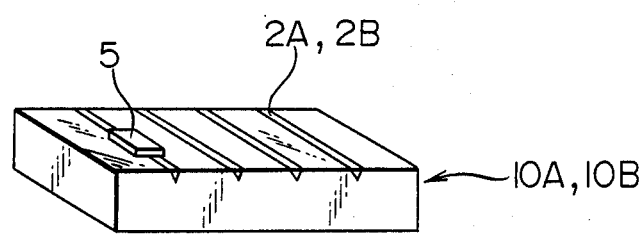
FIG. 4 is a perspective view illustrating a state wherein the displacement is detected by using the heat resisting magnetic scale according to the present invention.
Figure 5:
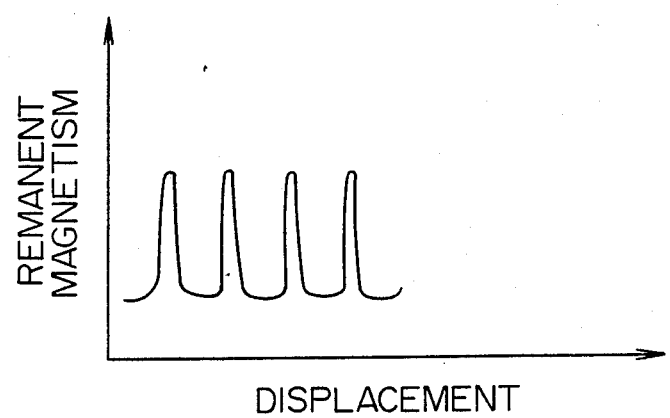
FIG. 5 is a view illustrating the relationship between the degree of magnetization and the displacement, each detected by a method shown in FIG. 4.

FIG. 4 is a perspective view illustrating a state wherein the displacement on the magnetic scale 10A is detected using a sensor 5 such as a hall element for detecting the remanent magnetism FIG. 5 is a relationship view illustrating the degree of magnetism detected by a method shown in FIG. 4, wherein the abscissa represents the displacement, while the ordinate represents the degree of remanent magnetism.

Referring to FIG. 2, when the plate-like base 1A made of non-magnetic stainless steel SUS 304 is irradiated with the electron beam 3 with the output of 1.1 KW, sweeping speed of 1.0 m/min, and the focal distance of +50 mm, the portion of the base 1A irradiated with the electron beam 3 is rapidly heated and melted. When the electron beam 3 is then moved, the portion which has been irradiated with the electron beam 3 is rapidly cooled down and congeals into the solid state. As a result of this, the portion which has been swept with the electron beam 3 is subjected to rapid heating and cooling in a linear or planar manner, causing extreme residual stress to be generated. It is known that the crystal structure in non-magnetic stainless steel such as SUS 304 that is partially changed from a face-centered cubic structure to a body-centered cubic structure, causing it to be magnetized. Therefore when the plate-like base 1A made of non-magnetic stainless steel SUS 304 is irradiated with the electron beam 3, a linear or planar magnetic layer 2, (a magnetic lattice) is formed on the surface or in the inner portion of the base 1A.

Since the thus formed magnetic lattice has great coercive force due to the extreme stress applied thereto, great remanent magnetism is generated when it is magnetized in the manner shown in FIG. 3.

Therefore, when the interval for applying the electron beam 3 is optionally determined and an element such as a hole element for detecting the remanent magnetism is used, the graph showing the relationship between the displacement and the remanent magnetism as shown in FIG. 5 can be obtained so that the displacement can be detected. According to the present invention, since the magnetic layers in a linear form or a planar form are individually formed by a thermal means at certain intervals in the surface and/or inner portion of the non magnetic base 1A, the remanent magnetism can be, as shown in FIG. 5, detected in the form of pulses. Consequently, a magnetic scale exhibiting stability and excellent detection sensitivity with respect to the conventional magnetic scale can be obtained.

Furthermore, since the portion 2A to be heated is formed by changing the base 1A into a body-centered cubic structure having magnetism, no separation will be generated. Furthermore, since it has the Curie point of 100 °C. or higher, a magnetic scale exhibiting excellent heat resistance can be obtained.

Although, in this embodiment, the output of the electron beam is arranged to be 1.1 KW, it may range between 0.1 to 15 KW. If the output of the electron beam is less than 0.1 KW, the base can be melted only by significantly lowering the sweeping speed, causing no magnetic layer to be formed. On the other hand, if the same exceeds 15 KW, the sweeping speed is needed to be significantly raised, otherwise, the width of the portion melted is widened, and the body to be melted cannot be rapidly cooled down, causing no magnetic layer to be formed. Therefore, the above speeds are impractical.

Although the sweeping speed of the electron beam is arranged to be 1.0 m/min, it may range between 0.1 to 15.0 m/min. Furthermore, as an alternative to the focal distance of the electron beams arranged to be +50 mm from the surface of the base, it may range between 0 and ± 100 mm. If the focal distance of the electron beam exceeds +100 mm or it is below −100 mm, the focal point of the electron beam is disposed too far away, and thereby the base cannot be melted, causing no magnetic layer to be formed. The preferable irradiating energy per unit length is 20 kJ/m to 300 kJ/m.

Although in the embodiment described above, the electron beam is used for heating, the other means such as laser beams, plasma, or resistance heating may be employed.

In the case of a laser beam, the output thereof, sweeping speed and the focal distance and the like are, similar to the case of the electron beam. Furthermore, in the embodiment described above, although the non-magnetic stainless steel SUS 304 is used as the heat resisting base 1, the other type of non-magnetic stainless steel such as SUS 316, SUS 309 or SUS 310 may be used.

The base 1 may be made of, as an alternative to the non-magnetic material, a ferromagnetic material. For example, it may be an alloy which can be subjected to hardening or a ferromagnetic material such as ferritic stainless steel S35C. It has been shown that in ferritic stainless steel such as S35C the hardness thereof can be significantly improved due to the effect caused after it is subjected to rapid melting and solidifying. Therefore, when the electron beam are applied to the base made of ferritic stainless steel S35C of ferromagnetic material, a layer in the form of a linear shape or a planar shape in which the magnetic characteristics are changed, that is, the magnetic lattice, is formed on the surface or the inner portion of the base.

The magnetic lattice which has been formed as described above has great coercive force since the hardness thereof has been raised due to the extreme stress applied thereto. Therefore it can generate great remanent magnetism when it is magnetized with the electromagnet 4 in the manner shown in FIG. 3. Therefore, in a manner similar to that described above, when the interval for applying the electron beam is optionally determined and an element for detecting the remanent magnetism, for example, a hole element 5 shown in FIG. 4 is used, the graph showing the relationship between the displacement and the remanent magnetism as shown in FIG. 5 can be obtained so that the displacement can be detected.

As the ferromagnetic material, iron, cobalt, nickel or the like can be also employed, and ferromagnetic materials having excellent heat resistance can be employed only necessitating that the magnetic characteristics thereof are changed, for example, ferrite or martensite stainless steel may be employed.

Figure 6:
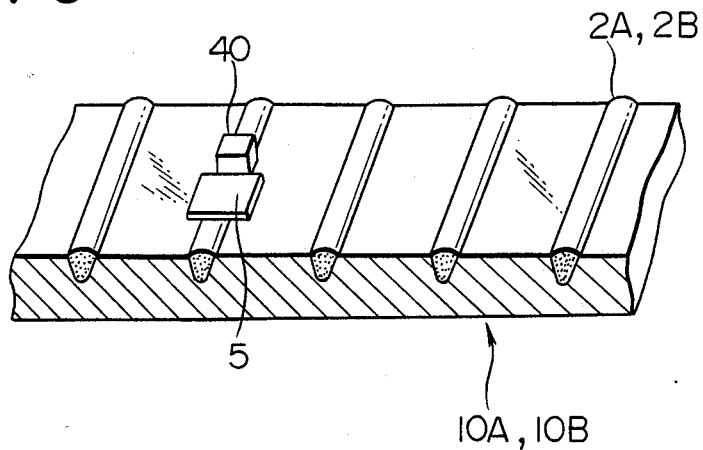
FIG. 6 is a perspective view illustrating a state wherein the displacement is detected by the heat resisting magnetic scale according to the present invention.

Although in the embodiment described above, the remanent magnetism is arranged to be detected by magnetizing the portion to be heated, an exciting magnet 40 and an element such as the hole element 5 for detecting the amount of magnetic flux may be, as shown in FIG. 6, used as an alternative to the manner in which the portion to be heated is previously magnetized. In such a manner, the relationship between the displacement and the remanent magnetism as shown in FIG. 5 can be obtained so that the displacement can be detected.

Furthermore, with the use of an exciting type magnetic detector described above, the scale according to the present invention can be used in environments subjected to high temperatures such as 300 to 400°C.

Although in the embodiment described above, the plate-like base is used as the heat resisting base, the base may be in the form of a rod. In this case, heating with electron beams can be applied with the rod base rotated.

Figure 7:
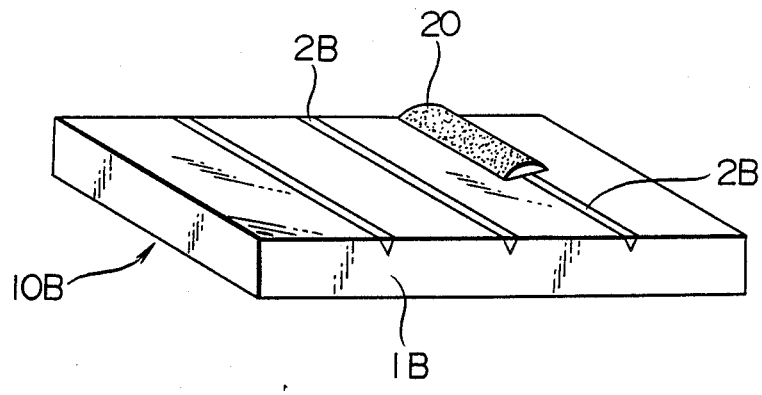
FIG. 7 is a perspective view illustrating a method of manufacturing a heat resisting magnetic scale according to another embodiment of the present invention.

FIG. 7 is a perspective view of a heat resisting magnetic scale 10B for illustrating a method of manufacturing a heat resisting magnetic scale according to another embodiment of the present invention. Referring to this figure, a plate-like heat resisting base 1B is made of a non-magnetic material such as austenitic stainless steel (for example JIS SUS 304). A material 20 made of a material which is different from that of the base 1B is formed on a portion 2B of the base 1B to be heated, the material 20 being made of small magnetic substances such as iron dust. The material 20 is heated by a heating means such as laser beams, for example, at predetermined intervals, and is immediately cooled down. In this portion 2B, the material 20 is mixed into the base 1B and the magnetic characteristics thereof are changed. In this case, the portion 2B forms a magnetic layer, and the Curie point thereof becomes 100° C. or higher.

A magnetic scale 10B is magnetized in the same manner as the magnetic scale 10A, as shown in FIG. 3, and, a result a relationship graph showing the degree of magnetism similar to FIG. 5 can be obtained.

Referring to FIG. 7, when dust of a magnetic material, for example, iron dust, is applied to the base 1B and laser beam 3 is applied to the former, the portion which has been irradiated with the laser beam 3 is rapidly heated and thereby melted, and the iron dust 20 is fused in and mixed with the stainless steel base 1B. When the laser beam 3 is then moved, the portion which has been irradiated with the laser beam 3 is rapidly cooled down and is congealed to the solid state. As a result of this, the portion which has been swept with the laser beam 3 is subjected to rapid heating and cooling in a linear or planar manner, causing the iron dust fused in the stainless steel base 1B to be congealed to the solid state without any diffusion. Since the iron dust 20 is fused and congealed to the solid state in the plate-like base 1B made of a linear or planar magnetic layer, (a magnetic lattice), is formed on the surface or in the inner portion of the base 1B.

Since the thus formed magnetic lattice has great coercive force due to the extreme residual stress generated by rapid cooling, great remanent magnetism can be generated when it is magnetized in the manner shown in FIG. 3. Therefore, when the interval for applying the laser beam 3 is optionally determined and an element for detecting the remanent magnetism, for example, a hole element, is used as shown in FIG. 4, the graph showing the relationship between the displacement and the remanent magnetism as shown in FIG. 5 can be obtained so that the displacement can be detected. According to the present invention, very narrow magnetic bodies corresponding to the beam width are individually formed on the surface and/or in the inner portion of the non-magnetic base by rapidly melting and solidifying with laser beams applied at a certain interval in the linear form or a planar form. Therefore, the remanent magnetism can be, as shown in FIG. 5, detected in the form of pulses. Consequently, a magnetic scale exhibiting excellent stability and detection sensitivity with respect to the conventional magnetic scale can be obtained.

Furthermore, since the portion 2B is formed by fusing the magnetic material into the non magnetic base 1B, it has the Curie point of 100° C. or higher; it can not lose magnetism even if it is subjected to high temperatures, providing it with excellent heat resistance.

Although in this embodiment, SUS 304 is employed as the non-magnetic material to form a base 1B, the other nonmagnetic stainless steel such as SUS 316, SUS 309, or SUS 310 may be used in a case wherein the material which is put on the base is a magnetic material, that is a ferromagnetic material is used. Furthermore, non-magnetic materials such as copper, zinc, iron, chrome, nickel, manganese, or aluminum or their alloys may be used. Ceramics may also be employed.

Furthermore, the base 1B may be made of a ferromagnetic material of a ferrite metal. In a case where Ni is employed as the material, the heated portion becomes non-magnetic , causing the magnetic characteristics to be changed. As a result of this, the effect similar to the described above can be obtained. Although in the above-described embodiment, heating with laser beams is conducted, other thermal means such as electron beams, or plasma can be used. In a case wherein heating with the electron beams or laser beams is conducted, the heating conditions such as output, sweeping speed and irradiating energy and the like can be arranged to be the same as in the above-described cases. Furthermore, although, in the above-described embodiment, iron dust is used as small dust 20 of a magnetic material, nickel dust or cobalt dust may be employed.

Figure 8:
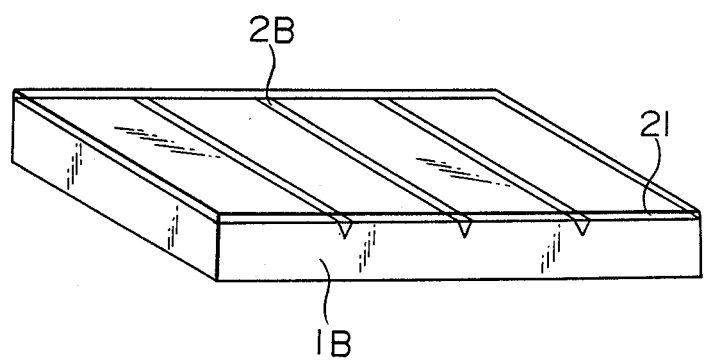
FIG. 8 is a perspective view of a method of manufacturing a heat resisting magnetic scale according to the other embodiment of the present invention.

Alternatively, the small dust material to be put on the base 1 may be, , applied in such a manner, as shown in FIG. 8; the surface of the base 1B is applied with a thin film 21 by plating or evaporation. That is, referring to FIG. 8, when the surface of the plate like base 1B made of non-magnetic Cu-Zn alloy applied with a thin film 21 made of a ferromagnetic material by plating or the like is irradiated with laser beams, the portion which has been irradiated with the laser beams is rapidly heated and thereby melted, causing the nickel to be fused in the base 1. When the laser beam is then moved, the portion which has been irradiated with the laser beam is then rapidly cooled down and is congealed to the solid state. As a result of this, the portion which has been swept with the laser beam is subjected to rapid heating and cooling in a linear or planar manner, causing extreme residual stress to be generated. As described above, since nickel of a ferromagnetic material applied to the surface of the plate-like base which is made of non-magnetic Cu-Zn alloy by plating or the like is irradiated with laser beams, the nickel is fused in the surface or the inner portion of the base in a linear form or planar form. This causes the formation of the nickel magnetic layer of ferromagnetic material, (magnetic lattices) in a linear or planar shape on the surface or the inner portion of the base made of non-magnetic Cu-Zn alloy .

Since the thus formed magnetic lattice has great coercive force due to the extreme residual stress, great remanent magnetism is generated when it is magnetized in the manner shown in FIG. 3. Therefore, when the interval for applying the laser beams is optionally determined and an element for detecting the remanent magnetism, for example, a hole element, is used as shown in FIG. 4, the graph showing the relationship between the displacement and the remanent magnetism as shown in FIG. 5 can be obtained so that the displacement can be detected. Furthermore, since nickel which is excellent in corrosion resistance is applied to the surface of the base made of Cu-Zn alloy, a heat resisting magnetic scale which can be used at high temperatures can be manufactured.

Although the ferromagnetic film such as nickel is, in this embodiment, per se applied, this ferromagnetic film may be removed by grinding or the like. Furthermore, in this embodiment, nickel is employed as the ferromagnetic film, another film made of an alloy having corrosion resistance such as iron, cobalt or nickel may be used. Furthermore, the thin film 21 shown in FIG. 8 may comprise a non-magnetic film such as chrome or molybdenum as an alternative to the above-described ferromagnetic film.

That is, referring to FIG. 8, when a chrome film which is applied, by plating or the like, to the surface of the plate-like base made of non-magnetic austenitic stainless steel SUS 304 is irradiated with laser beams, the portion which has been irradiated with the laser beam is rapidly heated and thereby melted and chrome of non-magnetic material is melted into the base. When the laser beam is then moved, the portion which has been irradiated with the laser beam is then rapidly cooled down and congealed to the solid state. As a result of this, the portion which has been swept with the laser beam is subjected to rapid heating and cooling in a linear or planar manner, causing extreme residual stress to be generated. As described above, since chrome of a non-magnetic material applied to the surface of the plate-like base which is made of non-magnetic stainless steel SUS 304 by plating or the like is irradiated with laser beam, the chrome is fused in the surface or the inner portion of the base in a linear form or planar form. Simultaneously the magnetic layer of ferromagnetic ferrite stainless steel, that is magnetic lattices are formed on the surface or the inner portion of the base which is made of non-magnetic austenitic stainless steel in a liner shape or planar shape. As described above, although the austenitic stainless steel is a non-magnetic material, it can be changed to ferromagnetic ferrite stainless steel by heating-cooling, such non-magnetic material can be used as the material.

Since the thus formed magnetic lattice has great coercive force due to the extreme residual stress, great remanent magnetism is generated when it is magnetized in a manner similar to that of the above-described embodiment shown in FIG. 3. Therefore, when the interval for applying the laser beams is optionally determined and an element for detecting the remanent magnetism, for example, a hole element, is used as shown in FIG. 4, the graph showing the relationship between the displacement and the remanent magnetism as shown in FIG. 5 can be obtained so that the displacement can be detected.

In the above-described embodiments, although a manner is employed in which the portion to be heated is magnetized in order to detect the remanent magnetism, another manner may be employed in which, as an alternative to the previous magnetization, an exciting magnet 40 and an element for detecting the magnetic flux such as hole element 5 may be used at the time of detection, as shown in FIG. 6. This causes the relationship between the displacement and the detected magnetic flux to be detected in a manner similar to that shown in FIG. 5. As a result of this, detection of displacement can be realized.

The above-described exciting type of magnetic detector can be used in environments which can be subjected to high temperatures of 300° to 400° C.

Although in the above-described embodiments, a plate-like base is employed as the heat resisting base, the base may be formed in a bar shape. In this case, the heating with electron beam or the like can be conducted with the bar-like base rotated.

As described above, the method according to the present invention comprises at least a part of the heat resisting base is heated and a manufacturing process in which the thus-heated portion is immediately cooled down so as to change the magnetic characteristics of the heating portion and to raise the Curie point of the above-described heating portion to 100° C. or higher.

Therefore, since the magnetic characteristics of the base is changed, any problems regarding separation will not arise. Furthermore, a heat resisting magnetic scale which cannot be demagnetized at high temperatures and therefore exhibits high measuring precision can be obtained.

Figure 9:
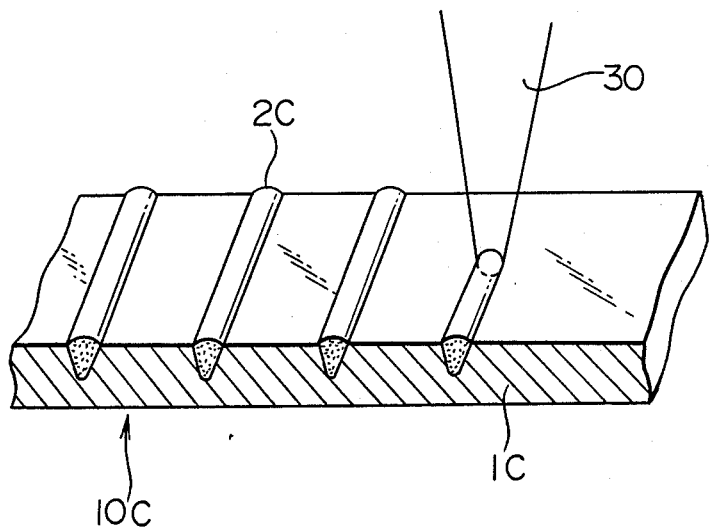
FIGS. 9 and 10 are perspective views of a magnetic scale for illustrating a method of manufacturing a heat resisting magnetic scale according to another embodiment of the present invention.
Figure 10:
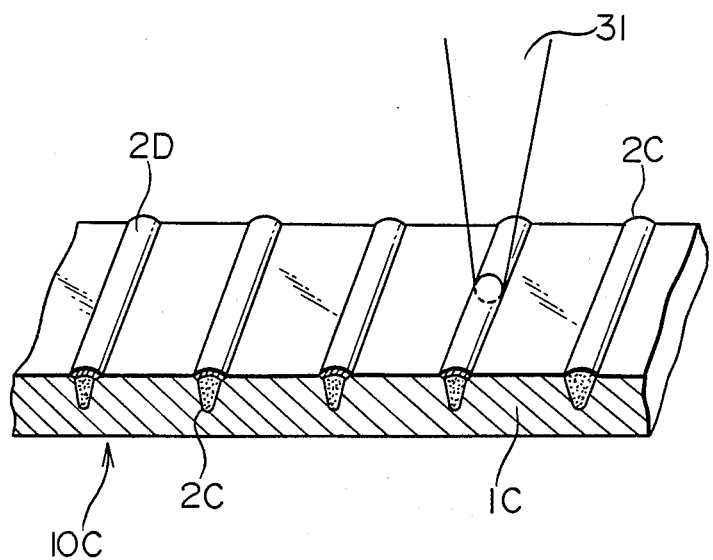

FIGS. 9 and 10 are perspective views of a partial cross-section of the heat resisting magnetic scale 10c for respectively illustrating another embodiment of the present invention. Referring to FIG. 9, a plate-like austenitic non-magnetic stainless steel (such as JIS SUS304) base material 1C is heated and melted by a first high energy density heat source such as electron beams or laser beams 30 so that magnetic body portions 2C which have been changed to magnetic bodies are formed at predetermined intervals in the base material 1C. In the austenitic phase of the magnetic body portions 2C, ferrite is plated. Next, reference numeral 2D represents a non-magnetic austenitic layer formed, as shown in FIG. 10, by applying pulses as a second high energy density heat source such as YAG laser 31 to the surface of the magnetic body portions 2C. The magnetic scale 10C is, similar to the magnetic scales 10A and 10B, magnetized as shown in FIG. 3 so that the relationship drawing showing the amount of magnetism similar to that shown in FIG. 5 can be obtained.

Referring to FIG. 9, by applying $CO_2$-laser beam with the output of substantially 1kW and the sweeping speed of substantially 1m/min to the base material 1C, the portion applied is rapidly heated and melted. Next, the beam is moved, the portion which has been applied with the beam 30 is rapidly cooled down and solidified. An austenitic stainless steel such as SUS304 is changed by fusion, solidification, and stress from austenite to ferrite in the form of magnetic bodycentered cubic lattice; as a result, it is magnetized. Since $CO_2$-laser beam 30 is applied to the base material 1C made of SUS304, a plate-like magnetic layer a magnetic lattice on the base material 1C.

Since ferrite having high Curie point is plated, the thus-formed magnetic lattice exhibits excellent heat resistance, but corrosion resistance is slightly deteriorated due to the deposition of ferrite.

Therefore, when YAG laser 31 is pulse-applied to the surface of the magnetic body portion 2C under the condition that the pulse energy is 10 J/p, the pulse width 2.0 ms, and the area applied with beam 10 mm$^2$, the portion to which the beam 31 is applied is instantaneously melted and then solidified only in the extreme surface layer thereof. The thus-solidified structure becomes completely an austenite structure. By successively applying beam to the surface of the magnetic body portions, the entire surface of the magnetic body portions 2C can be made into an austenite structure. That is, when the austenitic stainless steel such as SUS304 is solidified, it is solidified through two phases such that a first austenite is deposited as the primary crystal in a case where the cooling down speed is low, and then ferrite is deposited as the temperature is lowered. However, the laser beam is applied under the condition that the cooling down speed at the time of solidifying is raised significantly and the application order is $10^5$°K/sec; the deposit becomes austenite only, and no ferrite is deposited.

As described above, by conducting beam application twice by properly determining the beam application conditions, a magnetic layer can be formed in the base body of the non-magnetic austenite. Furthermore, since the entire surface is formed into an austenite structure, it can be used in an environment without any occurrence of corrosion.

Figure 11:
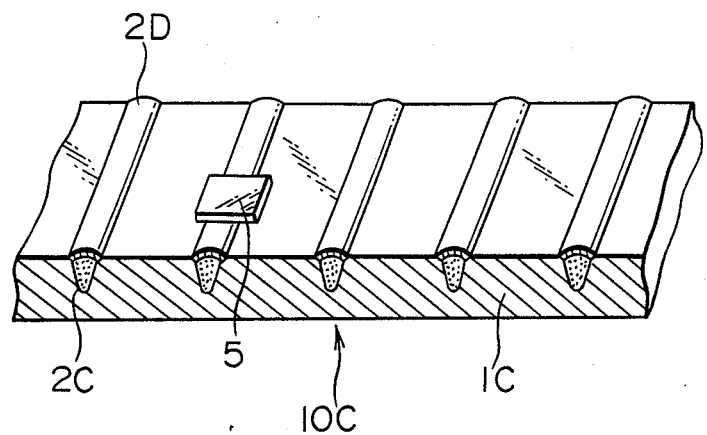
FIGS. 11 and 12 are perspective views of the magnetic scale for illustrating a state where displacement is detected by using the heat resisting magnetic scale according to the present invention.
Figure 12:
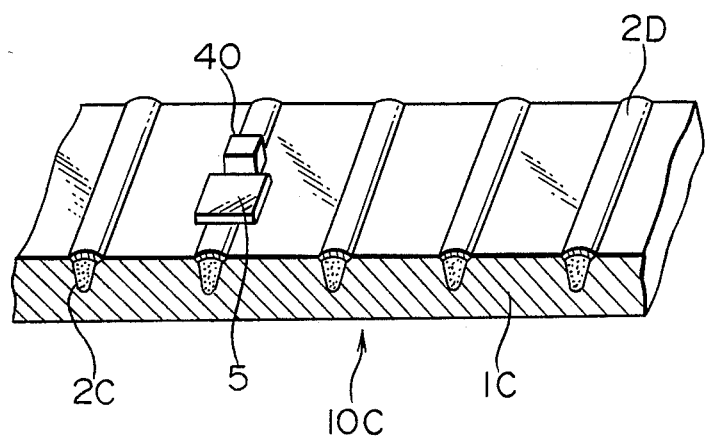

By conducting magnetization as shown in FIG. 3, the magnetic body portions 2C can be magnetized. Therefore, by optionally selecting the intervals of the portions in which the magnetic body portions 2C are formed by applying beams, and using a sensor 5 such as an element for detecting the residual magnetism, for example, a hole element, as shown in FIG. 11, the relationship between the displacement and the residual magnetism as shown in FIG. 5 can be obtained. As a result of this, detection of displacement can be conducted. In this method, since the magnetic layer 2C is formed in the non-magnetic base body 1C, the residual magnetism can be, as shown in FIG. 5, detected in a pulse form, causing the sensitivity for detection to become stable and to be significantly improved with respect to the conventional method.

Furthermore, since the Curie point of the ferrite deposited in the magnetic layer is relatively high (700°C.) excellent heat resistance can be obtained. In addition, since the entire surface of the magnetic body portions 2C is formed by austenite structure, an excellent corrosion resistance can also be obtained.

In the above-described embodiment, although $CO_2$-laser is employed as the first high energy density heat source, the other laser such as YAG laser or electron beam, plasma arc or plasma jet may be employed. Although YAG laser is employed as the second high energy density heat source, the others, such as $CO_2$-laser or electron beam from which pulse output and peak power density of substantially 1kW/mm$^2$ can be obtained, can be employed.

The above-described beam application conditions are only exemplary various conditions can, of course, be determined.

In the above-described embodiment, although non-magnetic stainless steel SUS304 is employed as the base material 1C, the other type of non-magnetic stainless steel such as SUS316, SUS309 and SUS310 may be employed.

In the above-described embodiment, a method is employed in which the residual magnetism is detected by way of magnetizing the magnetic body portions 2C, however, employment of a magnetizing magnet 40 and an element for detecting the magnetic flux such as a hole element 5 causes the similar relationship between the displacement and the detected magnetic flux to that shown in FIG. 5 to be obtained. As a result of this, displacement can also be conducted.

In this embodiment, since high energy density heat source is applied to the non-magnetic austenitic stainless steel to melt and solidify for the purpose of depositing ferrite having high Curie point and changing it to a magnetic body, any separation cannot occur even if it is used at high temperatures. Furthermore, its characteristics cannot be deteriorate due to the thermal stress. Furthermore, since the magnetic body is formed in the non-magnetic material in such a manner that non-magnetic austenite structure is again formed by applying, in a pulse form, the high energy density heat source which is converged to become high power density to the above-described portion at which the magnetic body is formed, magnetic lattices without any occurrence of corrosion can be formed.

What is claimed is:

1. A method of manufacturing a magnetic member capable of functioning as a heat and corrosion resisting magnetic scale comprising:

heating and melting a portion of a non-magnetic austenitic stainless steel base by a first high energy density heat beam whereby said portion is changed to a magnetic body;

irradiating said magnetic body portion with a second high energy density heat beam to heat and melt a surface layer of said magnetic body portion, and then rapidly solidifying the surface layer whereby said surface layer is changed to a non-magnetic austenitic stainless steel layer.

2. The method according to claim 1 wherein said first high energy density heat source is laser beam or an electron beam.

3. The method according to claim 1 wherein said first high energy density heat source is a plasma arc or a plasma jet.

4. The method according to claim 1 wherein said second high energy density heat source is a pulse-formed laser beam or an electron beam.

5. The magnetic scale produced by the process of claim 1 wherein said magnetic body portion retains its magnetic properties in high temperature environments.

6. The method of claim 1 wherein residual magnetism in a plurality of magnetic body portions representing elements of a magnetic scale is detachable as a series of pulses.

7. The method of claim 1 wherein said magnetic body portion has a Curie Point of at least 700°C.

8. The method of claim 1 wherein said magnetic body portion has a Curie Point of at least 100°C.

9. The method of claim 1 wherein said magnetic body portion has a Curie Point of at least 300°C.

10. A method of manufacturing a heat and corrosion resisting magnetic scale comprising:
heating and melting a portion of a non-magnetic stainless steel base by a first high energy density heat beam whereby said portion is changed to a magnetic body;
irradiating said magnetic body portion with a second high energy density heat beam to heat and melt a surface layer of said magnetic body portion, and then rapidly solidifying the surface layer whereby said surface layer is changed to a non-magnetic stainless steel layer.

11. The method of claim 10 wherein said non-magnetic stainless steel is austenite and said magnetic body is ferrite.

12. The magnetic scale produced by the process of claim 10 wherein said magnetic body portion retains its magnetic properties up to a temperature of about 100° C. for use in high temperature environments.

13. The magnetic scale produced by the process of claim 11 wherein said magnetic body portion retains its magnetic properties up to a temperature of about 100° C. for use in high temperature environments.

14. The method of claim 10 wherein residual magnetism in a plurality of magnetic body portions representing elements of a magnetic scale is detectable as a series of pulses.

15. The method of claim 10 wherein said magnetic body portion has a Curie Point of at least 700°C.

16. The method of claim 10 wherein said magnetic body portion has a Curie Point of at least 100°C.

17. The method of claim 10 wherein said magnetic body portion has a Curie Point of at least 300°C.

* * * * *

UNITED STATES PATENT AND TRADEMARK OFFICE
CERTIFICATE OF CORRECTION

PATENT NO.  : 4,935,070
DATED       : June 19, 1990
INVENTOR(S) : Ara et al.

It is certified that error appears in the above-identified patent and that said Letters Patent is hereby corrected as shown below:

ON THE TITLE PAGE
In item [75], the third inventor should be: --Hideo Ikeda--.

Column 11, line 5, after "is" insert --a--.
          line 18, change "detachable" to --detectable--.

Signed and Sealed this

Twenty-ninth Day of October, 1991

*Attest:*

HARRY F. MANBECK, JR.

*Attesting Officer*    Commissioner of Patents and Trademarks